June 4, 1968 H. P. MEHR 3,386,658
CONVERGENT-DIVERGENT JET EXHAUST NOZZLE FOR SUPERSONIC AIRCRAFT
Filed Dec. 8, 1965 2 Sheets-Sheet 1

INVENTOR.
HANS P. MEHR
BY
Harry C. Burgess
ATTORNEY

INVENTOR.
HANS P. MEHR

3,386,658
CONVERGENT-DIVERGENT JET EXHAUST NOZZLE FOR SUPERSONIC AIRCRAFT

Hans P. Mehr, Mason, Ohio, assignor, by mesne assignments, to the United States of America
Filed Dec. 8, 1965, Ser. No. 512,343
4 Claims. (Cl. 239—127.3)

ABSTRACT OF THE DISCLOSURE

The disclosure shows a variable area convergent-divergent exhaust nozzle for a jet engine, having a fluid exhaust duct and an outer housing in surrounding spaced relationship therewith to form a secondary fluid passage. The nozzle comprises a first plurality of longitudinally-extending movable members, pivotally connected at their upstream ends to said housing. A second set of longitudinally-extending movable members is pivotally connected at their downstream ends to the downstream ends of the first set of movable members. The second set of movable members defines the divergent portion of the nozzle and is connected to the housing so that the second set of members may assume varying degrees of divergence in a downstream direction. The length of the first set of movable members to the second set of movable members is in a ratio of between .5 and .7/1 in order that the second set of movable members will be automatically positioned at the proper angle of divergence for operation at subsonic and supersonic regimes.

---

The present invention relates to improvements in jet exhaust nozzles of the convergent-divergent type for use in supersonic aircraft and, more particularly, to such a nozzle having a "free-floating" adjustable secondary or divergent portion which eliminates the need for conventional actuation mechanisms.

Convergent-divergent exhaust nozzles, such as are currently used in jet engines for supersonic aircraft, essentially comprise a convergent passage which serves to accelerate the exhaust gas to sonic velocity, followed by a divergent passage which expands the exhaust gas to supersonic velocity. Typically, the convergent and divergent sections of the exhaust nozzle each consist of a plurality of movable wall members against which the exhaust gas stream exerts force to increase the effective thrust or operating efficiency of the engine. To expand the exhaust gas efficiently, the nozzle exit area or outlet of the divergent section (symbolized $A_9$) must bear a definite relation to the nozzle throat area or outlet of the convergent section (symbolized $A_8$). The throat area, being the minimum cross-sectional area in the nozzle, will determine the mass flow rate of the working fluid passing through the exhaust nozzle at a given pressure ratio across the throat at a given temperature. As is well known, the "critical" pressure ratio is the maximum pressure ratio that can be attained across the throat portion of the nozzle. The critical pressure ratio is achieved when the velocity of the working fluid passing through the nozzle is at the local velocity of sound. This occurs at approximately a pressure ratio of 1.89. Any further increase in the pressure of the working fluid merely results in expansion of the fluid downstream of the throat to ambient or atmospheric pressure, the pressure ratio across the throat remaining at the critical level. Thus any such increase in the pressure of the working fluid downstream of the throat or convergent passage produces little further increase in the amount of useful energy in the form of thrust extracted from the working fluid unless a divergent portion downstream of the throat is provided. This nozzle, known as the "convergent-divergent" nozzle can provide a maximum amount of useful thrust from the complete expansion of the working fluid in the nozzle from a pressure ratio greater than critical to ambient.

In aircraft designed for operation over a wide range of speeds, i.e., a wide range of nozzle pressure ratios, such as supersonic aircraft, the aforesaid movable wall means are usually provided for varying the degree of divergence in the convergent-divergent nozzle, i.e., adjusting the "expansion ratio" of the nozzle. The expansion ratio is defined as the ratio $A_9/A_8$, i.e., the ratio of the exit area to the throat area. An example of a convergent-divergent nozzle having an adjustable expansion ratio may be found in U.S. Patent No. 3,214,905, entitled "Variable Area Convergent-Divergent Nozzle," of common assignment with the invention herein. In practice it has been found desirable, for optimum efficiency and maximum thrust over a wide operating range, that the nozzle also incorporate means to vary the cross-sectional area of the nozzle throat, generally in accordance with the engine power setting. The pressure ratio of the nozzle is determined by comparing the pressure of the working fluid entering the nozzle to the ambient or atmospheric pressure ($P_8/P_0$). Such nozzles therefore incorporate separate sets of flaps or fingers for both the secondary and primary sections to vary the exit area, as well as the throat area. Heretofore means have also been required for actuation of these flap members to achieve the desired area variations for a given mission requirement, which will include take-off, subsonic loiter and supersonic cruise operation of the air vehicle. An example of an actuation mechanism for such a purpose may be found in the U.S. patent of common assignment No. 3,214,904, entitled "Variable Area Convergent-Divergent Nozzle and Actuation System Therefor."

It will be obvious to those skilled in the art that the ever-increasing requirements for more speed and efficiency dictate the need for using lightweight components whenever possible. Taking this principle a step further, it will be appreciated that considerable cost savings, efficiency, economy of operation, and improved performance may be achieved by the elimination of the relatively heavy, complex and sometimes unreliable electronic or hydraulically actuated mechanical systems for achieving variation of throat and exit areas by adjustment of the movable nozzle flaps or fingers.

It is, therefore, a primary object of the invention to provide an improved convergent-divergent jet exhaust nozzle for supersonic aircraft which nozzle incorporates means for achieving variation of the nozzle expansion ratio without the need for providing an actuating mechanism especially for this purpose.

More specifically, it is an object of this invention to provide such a nozzle wherein variations in the nozzle exit area are areodynamically achieved by means of a "free-floating" secondary or divergent nozzle section arrangement.

Another object of this invention is to provide a nozzle wherein the secondary airflow or pressure may be utilized to control the nozzle exit to throat area ratio by "aerodynamically" adjusting the pressure on opposing surfaces of the divergent portion of the nozzle to effectuate the change in the exit area in the desired direction.

Briefly stated, the invention is directed to a jet engine exhaust nozzle of the convergent-divergent type, wherein at least the secondary or divergent portion includes a plurality of movable wall members or flaps. The flaps are utilized for variation of the nozzle exit area, which simultaneously effects a variation in the nozzle expansion ratio, or the ratio of the exit area to the throat area ($A_9/A_8$). The invention, as disclosed, is specifically directed to the improvement whereby the desired position of the divergent flaps is achieved aerodynamically, that is, it is unnecessary with use of this invention to require the conventional hydraulic or electrical actuation mechanism for moving the flaps. Thus, for a given aircraft mission requirement, it is possible to select a ratio for the axial length or longitudinal extension of the divergent section inner flap portion (L) with respect to that of the outer flap portion thereof ($L_0$) such that the nozzle secondary will be "free-floating," i.e., it will move—without application of mechanical force—to a position of optimum performance.

While the specification concludes with claims particularly pointing out and distinctly claiming the subject matter which I regard as my invention, it is believed that the invention and further advantages and objects thereof may be better understood from the following detailed description taken in connection with the accompanying drawings in which:

Figure 1:
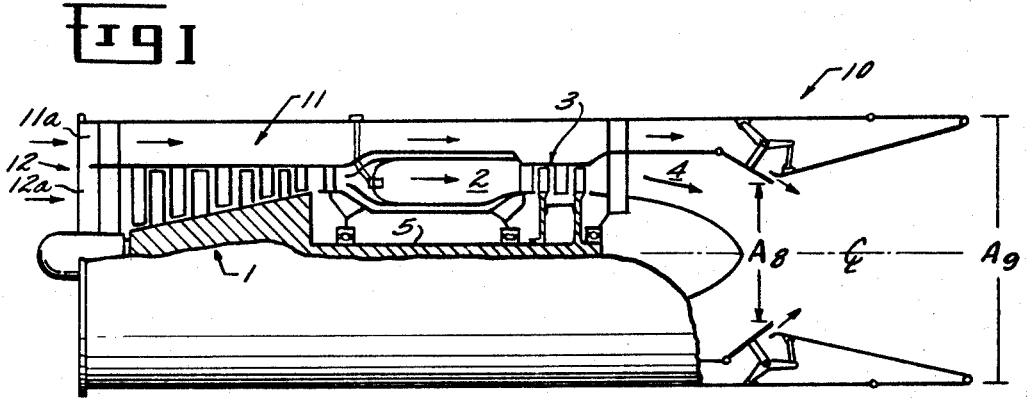
FIG. 1 is a diagrammatic cross-sectional view of a typical turbojet engine utilizing the exhaust nozzle of the invention.

Turning now specifically to the drawings, FIG. 1 is a cross-sectional view of a typical jet engine of the turbojet variety. For example, there is a rotating axial-flow compressor 1, combustion means 2 for heating and increasing the velocity of the compressed air received from the compressor, and power turbine means 3. The power turbine expands the hot gases from the combustion section into the tailpipe area 4 from whence the gases are exhausted to the atmosphere. A part of the power output of the turbine is, of course, used to drive the compressor through a shaft 5 connecting the two rotating components. The available energy in the exhaust gas stream of the turbojet engine is converted to kinetic energy or thrust of the jet. As explained above, it is necessary for optimum operating efficiency to take advantage of all the thrust or reaction force available in the exhaust gas stream. In the case of supersonic aircraft, in particular, it is necessary to do this over a wide range of operating conditions and exhaust nozzle pressure ratios. To provide this optimum wide range operating capability, the turbojet illustrated in FIG. 1 is provided with the improved convergent-divergent exhaust nozzle of my invention, indicated generally at 10. While for ease of illustration a conventional turbojet gas turbine engine has been described, it should be understood that the invention incorporated in the nozzle will be equally useful to the operation of a turbofan type of gas turbine wherein a fan or low pressure compressor (not shown) is provided in the auxiliary duct indicated at 11 coaxially arranged around the primary duct 12 containing the basic gas generator described hereinabove. In the gas turbine cycle arrangement depicted in FIG. 1, the primary air stream enters inlet area 12a and goes through the axial-flow compressor 1 to be heated in and expanded in a manner described while, at the same time, the secondary air stream enters inlet 11a, passing through the secondary passage 11. The secondary air, if desired, may be utilized to aid in achieving aerodynamic control or variation of the expansion ratio ($A_9/A_8$) of the exhaust nozzle, as hereinafter described.

As shown in the drawings, the throat or convergent portion of the nozzle is designated by the plane $A_8$, while the exit area is designated by the plane $A_9$. While not absolutely essential to the operation of the engine, for improved efficiency the convergent portion of the nozzle may comprise a plurality of movable flaps or fingers, one of which is indicated at 20 in FIG. 2. The throat are $A_8$ is thus formed by the series of circumferentially arranged primary flaps which in the disclosed embodiment are pivotally attached at 22 to a tailpipe duct 24. The divergent or secondary portion of the convergent-divergent nozzle 10 is likewise formed by one or more series of circumferentially arranged flaps or fingers. Thus, there are a plurality of inner divergent flaps, one of which is indicated at 28, pivotally supported at their downstream ends by hinge means 30 attached to outer support members or flaps, one of which is indicated at 32. The outer divergent flaps or fingers 32 are in turn pivotally supported at 34 at the downstream end of the engine outer casing or nacelle 36. It will therefore be realized that the divergent or secondary portion of the nozzle comprises circumferentially and coaxially arranged pluralities of inner flaps 28 and outer flaps or support members 32 pivotally secured to supporting structure in the engine.

As explained above, after the pressure of the motive fluid in the nozzle achieves "critical" at the throat, it is thereafter expanded to ambient in the divergent portion of the nozzle, appropriately adjusted for optimum operation. It may also be desirable to provide controlled egress of the secondary air, indicated by the arrows in FIGS. 1 and 2, from the passage 11 into the discharge portion of the nozzle. For this reason an annular gap 40 may be provided between the downstream ends of the primary flaps 20 and the upstream ends of the inner divergent or secondary flaps 28. Means for controlling the area of the gap 40 during movement of the flaps may be provided in the form of a suitable linkage mechanism, indicated generally at 42. The linkage mechanism may comprise link bars 44 and 46 pivotally attached to the secondary and primary flaps, respectively. The links, in turn, are pivotally attached to a bellcrank 48. The bellcrank is itself pivotally supported at 49 from the nacelle or casing 36.

Figure 3:
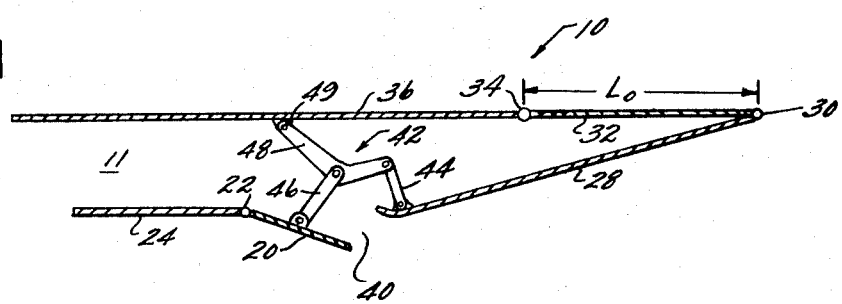
FIG. 3 is a view similar to FIG. 2 showing the nozzle in position for thrust augmentation or supersonic cruise operation.

It will be noted in the cross-sectional view of FIG. 3, which is taken along a horizontal plane through the engine, that the axial length ($L_0$) of the outer divergent flaps 32 is significantly less than the axial length of the inner divergent flaps 28. It is by specifically controlling the ratio $L_0/L$ for a given aircraft mission or engine operating requirement that the "free-floating" or aerodynamic positioning of the secondary or divergent portion of the nozzle is accomplished, in accordance with my invention. That is, by proper selection of the length of the outer supporting flap or finger 32 relative to that of the inner flap 28 of the divergent section, the inner surface area of the divergent section is made considerably larger than the outer surface area. Thus, when the exit area of the nozzle 10 is required to be adjusted for optimum nozzle performance, which will be affected by the nozzle pressure ratio $P_8/P_0$ (where $P_8$ is the total pressure at the throat and $P_0$ is ambient pressure), the relative differential pressures across the outer nozzle flaps and the inner flaps, respectively, are controlled to cause the nozzle to "float" to the desired position.

Figure 2:
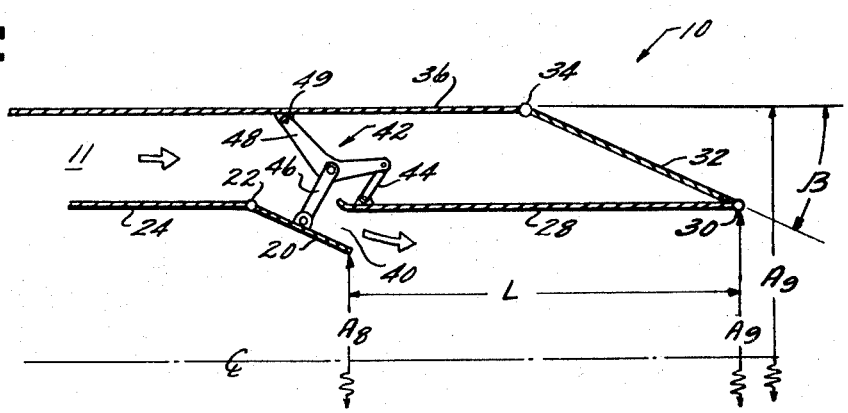
FIG. 2 is an enlarged partial diagrammatic view of the jet engine exhaust nozzle of FIG. 1 with the nozzle flaps shown in the position for subsonic operation.

Specifically, in any typical nozzle configuration where the inner and outer divergent flap areas are essentially equal, an actuation force will be required to move the divergent flaps to set the exit area to the desired value due to the considerable difference in relative pressure across the respective flaps. With the arrangement disclosed herein, the length of the outer flap is properly selected, keeping in mind the difference in circumference of the annular surfaces presented by the pluralities of circumferentially arranged flaps 32 and 28, respectively, so that the divergent section of the nozzle will "float" to a calculated position of optimum performance. To explain further, in the subsonic operating regime, as shown in FIG. 2, the nozzle pressure ratio $P_8/P_0$ is relatively low. As a result, the internal nozzle expansion ratio $A_9/A_8$ must be kept fairly low for efficient working fluid expansion within the nozzle. Consequently, the differential pressures on the inner flaps 28 should be and is controlled to be lower than the differential pressure on the outer surfaces of the flaps 32. For example, the secondary air pressure in passage 11 may be controlled by either adjustment of the inlet area 11a by suitable closure means (not shown), or by controlling the size of gap 40 by automatic linkage adjustment with the result that there is a net closing force on the nozzle. Thus, at the exit area value for optimum subsonic performance, although the differential pressure across the flaps 32 is higher than the differential pressure across the flaps 28 the area of the flaps 32 is smaller than the total area of flaps 28. The movable members of the divergent section therefore tend to assume the position shown in FIG. 2 without the need for any flap actuation system. Actuators (not shown) may be of course provided to move the primary flaps and the link mechanism 42. While adjustment of the throat area ($A_8$) for efficient subsonic operation by moving the primary flaps 20 will result in the secondary nozzle "floating" to another position, due to the linkage arrangement the annular gap 40 remains substantially unchanged. Thus, in combination with the proper preselected $L_0/L$ ratio it is this control of the motive fluid expansion or lowering of the static pressure in the divergent portion of the convergent-divergent nozzle together with the controlled secondary air pressure that "floats" the nozzle to the optimum position.

When it is desired, on the other hand, to operate in the supersonic cruise position, as indicated in FIG. 3, the nozzle expansion ratio ($A_9/A_8$) must be increased. That is, the exit area $A_9$ must move towards the maximum open position. In supersonic operation the pressure ratio across the nozzle ($P_8/P_0$) naturally rises due primarily to the increase in ram air pressure. The result of these higher pressure ratios is that the pressure on the inner surfaces of the inner divergent flaps or fingers 28 is higher than the pressure into which the gas stream is exhausted. By reason of the inner surface of each flap 28 being considerably larger than the outer surface of each flap 32 because the length of the outer flap is properly selected, the forces are such that the nozzle will "float" to the position shown in FIG. 3. Again, no actuating mechanism is required.

Figure 4:
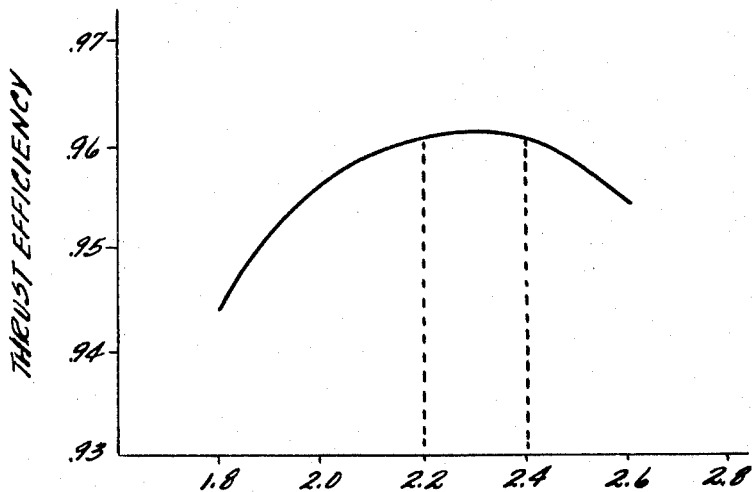
FIG. 4 is a graph illustrating the relationship between the expansion ratio and operating efficiency (thrust coefficient) over a given operating range.
Figure 5:
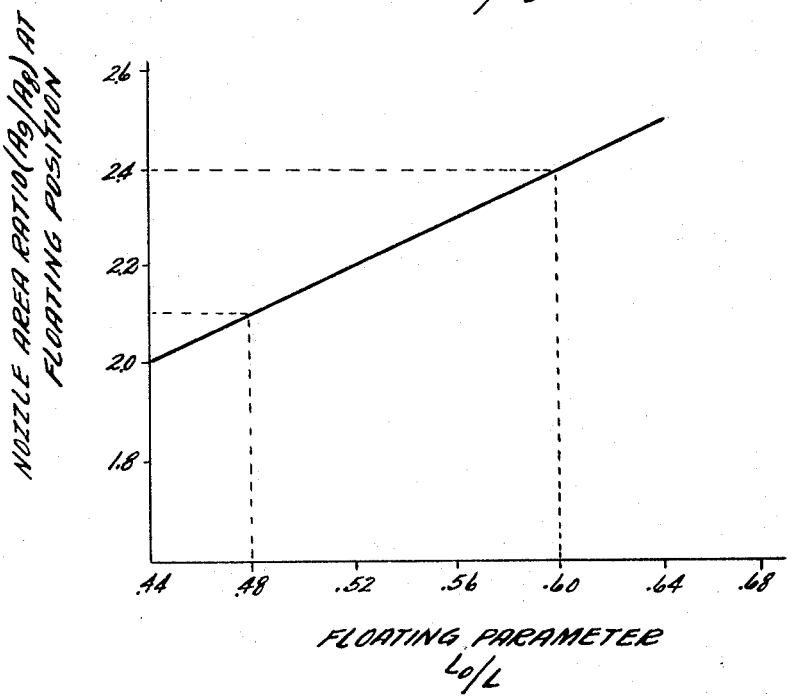
FIG. 5 is a graph illustrating the $L_0/L$ ratio for a given mission requirement with respect to nozzle area ratio at the "floating" position.

Viewing it another way, in the subsonic operating regime optimum propulsive efficiency of the nozzle is achieved when the exit area ($A_9$) is only slightly larger than the throat area ($A_8$). At this point the expansion ratio ($A_9/A_8$) is at a minimum. This will prevent overexpansion of the working fluid below atmospheric pressure. In this operating regime, secondary air from passage 11 exits through the annular gap 40 which controls the rate at which the relatively low velocity secondary air will fill the annular area that separates the working exhaust gas stream or jet and the atmospheric air stream passing over the engine nacelle at the exit area of the engine or the outer flaps at 32. Further, the angle which the flaps 32 form with respect to a line parallel to the axis of the engine is usually called the convergent "boattail" angle and is indicated by angle B in FIG. 2. This angle is selected to cause the atmospheric air passing over the nacelle to converge upon the exhaust stream so as to locate the primary or main gas exhaust jet to reduce mixing and consequent acceleration of the secondary low speed airstream. Conversely, during transonic or intermediate pressure nozzle operation, the divergent portion of the nozzle operates to expand the pressure of the motive fluid in excess of the critical pressure ratio to approximately atmospheric pressure. This increases the velocity of the working fluid to the supersonic value necessary for efficient operation of the air vehicle. At this point the secondary or divergent portion of the nozzle will be adjusted so that the motive fluid is not expanded further. In other words, the $A_9/A_8$ ratio is chosen for the most efficient use of the thrust available in the gas stream. If the flight speed is now increased to a value greatly in excess of supersonic velocity, the pressure of the gas stream which enters inlets 11a and 12a is materially increased. At this point the divergent portion of the nozzle section must be enlarged to expand the motive fluid to substantially atmospheric pressure. For this reason an increased ratio of the exit area to throat area, i.e., $A_9/A_8$, must be accomplished. As explained above, as the primary motive fluids leaves the convergent section it will continue to expand and decrease in static pressure in the secondary portion. For example, for a given turbojet engine, at Mach 1.2 (1.2× the speed of sound under standard conditions) an internal nozzle expansion ratio of about 2.0 is indicated for optimum internal performance of the nozzle. At the calculated position of the divergent flaps, however, external pressure caused by airflow over the "boattail" section is significant which results in a calculated increase in the installed nozzle expansion ratio of 2.2 to 2.4, as shown in FIG. 4. For a given nozzle, therefore, the "floating" position expansion ratio $A_9/A_8$ is determined by what I have termed the "floating" parameter $L_0/L$, as shown in FIG. 5. From the latter figure it will be seen that for the nozzle divergent section to "float" to a position of optimum installed efficiency during transonic acceleration an $L_0/L$ ratio of between .5 and .6 was required. Further, for the nozzle flaps to "float" to the maximum exit position for high supersonic cruise $L_0/L$ ratio of .6 was required. Obviously, for different engine and aircraft mission requirements slightly different $L_0/L$ ratios may be selected within a preferred range of .5 to .7. In any event, the ratio will be chosen such that the divergent nozzle flaps will "float" to the desired positions. By regulating the secondary air pressure, either through inlet area sizing or gap 40 sizing, or both, the relative differential pressures across the inner and outer flaps 32 and 28, respectively, can be changed sufficiently to aid the aerodynamic positioning without need for an actuation mechanism for the divergent flaps.

While a particular embodiment of the means of the present invention has been disclosed, it will be obvious to those skilled in the art that various changes and modifications may be made in such embodiment without departing from the spirit or scope of the invention, and it is therefore intended in the appended claims to cover all such equivalent variations and modifications.

What I claim and desire to secure by Letters Patent is:

1. A variable area convergent-divergent exhaust nozzle for a jet engine having a primary fluid exhaust duct and an outer housing in surrounding spaced relationship therewith to form a secondary fluid passage, said nozzle comprising:

free-floating nozzle means comprising first and second pluralities of longitudinally extending movable members;

means for pivotally connecting the upstream ends of said first plurality of movable members to the downstream end of said housing;

means pivotally interconnecting the respective downstream ends of first and second pluralities of movable members;

means controlling the position of the upstream ends of the second plurality of movable members whereby said members may pivot and the second set of members form varying degrees of divergence in a downstream direction, and said first plurality of members having a length ($L_0$) substantially shorter than the length ($L$) of the second plurality of members, thereby providing aerodynamic means for automatically positioning said second set of members at the proper angle of divergence for the operating conditions of the engine.

2. A variable area convergent-divergent exhaust nozzle as in claim 1 wherein, the ratio of $L_0/L$ is between .5 and .7.

3. A variable area convergent-divergent exhaust nozzle for a jet engine as in claim 2 wherein,
   the jet engine further comprises a primary exhaust duct disposed concentrically within said housing and has a plurality of primary flaps pivotal thereon for defining a convergent portion of the nozzle upstream of the secondary flaps,
   said primary duct housing forming an annular passageway, pressurized by secondary air, effective on the opposed surfaces of the first and second plurality of movable members.

4. A variable area convergent-divergent exhaust nozzle as in claim 3 wherein the area of the downstream ends of the second plurality of wall members ($A_9$) to the area of the downstream ends of the primary flaps ($A_8$) has a ratio ($A_9/A_8$) in the range of approximately 2.0 to 2.6, and
   means for interconnecting the primary flaps and the second plurality of wall members to provide for a schedule flow of secondary air therebetween.

References Cited

UNITED STATES PATENTS 3,057,150  10/1962  Horgan _____ 239—265.41 X
3,214,905  11/1965  Beavers et al. ___ 239—265.41 X M. HENSON WOOD, JR., *Primary Examiner.*

V. M. WIGMAN, *Assistant Examiner.*